United States Patent [19]

Edahiro et al.

[11] Patent Number: 5,009,449
[45] Date of Patent: Apr. 23, 1991

[54] VEHICLE REAR SUSPENSION SYSTEM

[75] Inventors: Takeshi Edahiro, Higashihiroshima; Seita Kanai, Hiroshima, both of Japan

[73] Assignee: Mazda Motor Corporation, Hiroshima, Japan

[21] Appl. No.: 383,656

[22] Filed: Jul. 24, 1989

[30] Foreign Application Priority Data

Jul. 27, 1988 [JP] Japan .................. 63-187492
Jul. 27, 1988 [JP] Japan .................. 63-187493
Jul. 29, 1988 [JP] Japan .................. 63-188362

[51] Int. Cl.$^5$ .............................................. B60G 3/00
[52] U.S. Cl. ..................................... 280/690; 280/697; 280/701
[58] Field of Search .............. 280/688, 690, 697, 698, 280/700, 701

[56] References Cited

U.S. PATENT DOCUMENTS

| | | | |
|---|---|---|---|
| 4,440,419 | 4/1984 | Kosak et al. | 280/701 |
| 4,650,209 | 3/1987 | Sumimoto | 280/690 |
| 4,690,426 | 9/1987 | Kubo et al. | 280/690 |
| 4,754,992 | 9/1987 | Asanuma | 280/690 |

FOREIGN PATENT DOCUMENTS

| | | | |
|---|---|---|---|
| 8507 | 1/1984 | Japan | 280/701 |
| 61-59107 | 4/1986 | Japan. | |
| 62-80104 | 4/1987 | Japan. | |
| 62-80105 | 4/1987 | Japan. | |
| 2177983 | 2/1987 | United Kingdom | 280/701 |

Primary Examiner—Charles A. Marmor
Assistant Examiner—Tamara L. Finlay
Attorney, Agent, or Firm—Fleit, Jacobson, Cohn, Price, Holman & Stern

[57] ABSTRACT

A vehicle rear suspension system comprises a wheel carrying member for rotatably carrying a wheel of a vehicle, a plurality of lateral links connected to a vehicle body at inner ends and to the wheel carrying member at outer ends, a trailing arm extending rearwardly and connected to the vehicle body at its front end for pivotal movement and to the wheel carrying member at its rear end through a joint. The joint is located on a substantially straight line extending through both a front connecting point between the trailing arm and the vehicle body and a wheel center or outward of the line in the transverse direction. The joint allows a relative angular displacement between the wheel carrying member and the longitudinal member in a substantially horizontal plane so that no toe-out movement is produced in the wheel under a braking condition of the vehicle.

17 Claims, 5 Drawing Sheets

VEHICLE REAR SUSPENSION SYSTEM

BACKGROUND OF THE INVENTION

1. Field of the Invention

The present invention relates to a vehicle suspension system, and specifically to a rear suspension system for a motor vehicle.

2. Description of the Prior Art

Conventionally, a vehicle rear suspension system, such as is shown in U.S. Pat. Nos. 4,754,992, 4,690,426, comprises a wheel carrying member for rotatably carrying a vehicle wheel, a plurality of lateral links extending outwardly in a transverse direction of a vehicle body and connected to the wheel carrying member at the outer ends thereof, and a trailing arm or longitudinal member extending in a longitudinal direction of the vehicle body and connected to the wheel carrying member at a rear end thereof so as to effect toe angle and camber angle controls of the wheel when the wheel is bumped to move upward relative to the vehicle body and rebounded to move downward relative to the vehicle body during running of the vehicle.

With this suspension system structure, the longitudinal member is normally connected with the wheel carrying member through a rigid connection to resist against a moment acting on the wheel under a braking operation. It has been also known in such a suspension system that the trailing arm is constituted by a plate member flexible in the transverse direction of the vehicle body. Also a busing member deformable in the transverse direction is provided in a joint of the longitudinal member pivotally connected to a body member of the vehicle to allow a toe angle change of the wheel under the bumping action and the rebounding action of the wheel. It should be noted, however, that these suspension system structures are disadvantageous because a desirable toe angle change can be hardly obtained in the wheel.

Under these circumstances, there has been proposed a suspension system in which the longitudinal member is connected at a rear end thereof with the wheel carrying member through a joint which allows a pivotal movement between the longitudinal member and the wheel carrying member about a vertical axis and restricts a displacement of the longitudinal member relative to the wheel carrying member along the vertical axis so that the longitudinal member bears the wheel against the moment acting thereon under a braking condition and the like and the wheel smoothly produces a desirable toe angle change in the bumping action and the rebounding action as shown in Japanese Utility Model Public Disclosure No. 61-59107, laid open to the public in 1986.

With the structure proposed in the Japanese Utility Model application, i.e., wherein the longitudinal member for bearing a force acting on the wheel in the longitudinal direction of the vehicle body is pivotally connected with the wheel carrying member, the joint between the longitudinal member and the wheel carrying member allows a rotative movement of the longitudinal member relative to the wheel due to a rearward force acting on the wheel under a braking operation. This movement may affect a toe direction of the wheel defined by the plurality of the lateral links of the suspension system. In this regard, when the brake is operated, the rearward force resulted from the braking operation acts on a wheel center. The joint between the longitudinal member and the wheel carrying member is located spaced from the wheel center forwardly and inwardly by a certain distance respectively in a horizontal plane including the wheel center. As a result, when a rearward force acts on the wheel center due to the braking operation, the rearward force produces a moment causing a change in a toe direction of the wheel.

Generally, the toe direction of a wheel, specifically that of a rear wheel, affects the running stability of the vehicle. Therefore, an arrangement of the lateral links is contemplated to optimize the toe direction of the wheel. It will be thus understood that the moment acting on the joint is undesirable in establishing an optimal toe direction of the wheel. In particular, a moment which causes the wheel to produce a toe angle change in a toe-out direction from a point of running stability of the vehicle under a braking condition should be avoided.

SUMMARY OF THE INVENTION

It is, therefore, an object of the invention to provide a vehicle rear suspension system which can suppress a toe angle change of a wheel in a toe-out direction under a braking condition.

It is another object of the invention to provide a vehicle rear suspension system having a pivotal joint between a rear end of a longitudinal member and a wheel carrying member which can suppress a moment caused by a rearward force acting on a wheel due to a braking operation of the vehicle.

It is still another object of the invention to provide a vehicle rear suspension system which can produce a toe angle change of a wheel in a toe-in direction under a braking condition.

It is a further object of the invention to provide a vehicle rear suspension system which can produce a toe angle change of a wheel in a toe-in direction under a bumping action and a rebounding action of the vehicle.

According to the present invention, the above and other objects can be accomplished by a vehicle rear suspension system comprising wheel carrying means for rotatably carrying a wheel of a vehicle, a plurality of lateral member means extending in a transverse direction of the vehicle and connected to a vehicle body at its inner end and to the wheel carrying means at its outer end, longitudinal member means extending in a longitudinal direction and connected to the vehicle body at its front end for pivotal movement and to the wheel carrying means at its rear end through joint means, the joint means being located on a substantially straight line extending through both a front connecting point between the longitudinal member means and the vehicle body and a wheel center or outward of the line in the transverse direction and allowing a relative angular displacement between the wheel carrying means and the longitudinal member means in a substantially horizontal plane.

The wheel carrying means is preferably provided with an extension extending forwardly to be connected with the longitudinal member means through the joint means. The extension extends forwardly beyond a front end of a tire of the wheel in one embodiment of the present invention. The extension may have an arcuate configuration curved transversely outwardly.

In a preferred embodiment, the joint means is constituted by pivot means having an axis extending substantially in an up and down direction for allowing a relative angular or swinging movement about the axis.

The axis of the pivot means preferably extends, relative to a vertical direction obliquely outwardly and downwardly. Alternatively, the axis of the pivot means may, extend relative to the vertical direction, obliquely, forwardly and downwardly. The joint means may comprise a pair of ball joints spaced from each other in the up and down direction.

Further, the joint means can be provided with liquid sealed bushing means. In one embodiment of the present invention, the bushing means are arranged to provide a damping effect against the relative swinging movement between the longitudinal member means and the wheel carrying means. In another embodiment of the present invention, the bushing means are arranged to provide a damping effect against a relative displacement in the longitudinal direction therebetween. The bushing means is provided with shaft means extending in the transverse direction, rubber member surrounding the shaft means, a pair of liquid or oil chambers formed in the rubber member for providing the damping effect and located opposite sides of the shaft means in the longitudinal direction of the vehicle or in the up and down direction.

The lateral member means can be constituted by three lateral links carried independently from one another. In a preferred embodiment, the wheel carrying means is connected with the vehicle body through a suspension arm at an upper portion. A pair of lateral links spaced in the longitudinal direction connect a lower portion of the wheel carrying means with the vehicle body.

According to the above structure of the suspension, when a rearward force resulting from a braking operation acts on the wheel, no substantial moment causing a toe-out movement of the wheel is produced about the joint means. Although a slight moment may be produced about the joint means to cause a toe-in movement of the wheel, this trend is desirable for getting running stability.

The above and other objects and features of the present invention can be understood from the following description, taking reference with the accompanying drawings.

DESCRIPTION OF THE PREFERRED EMBODIMENT

Figure 1:
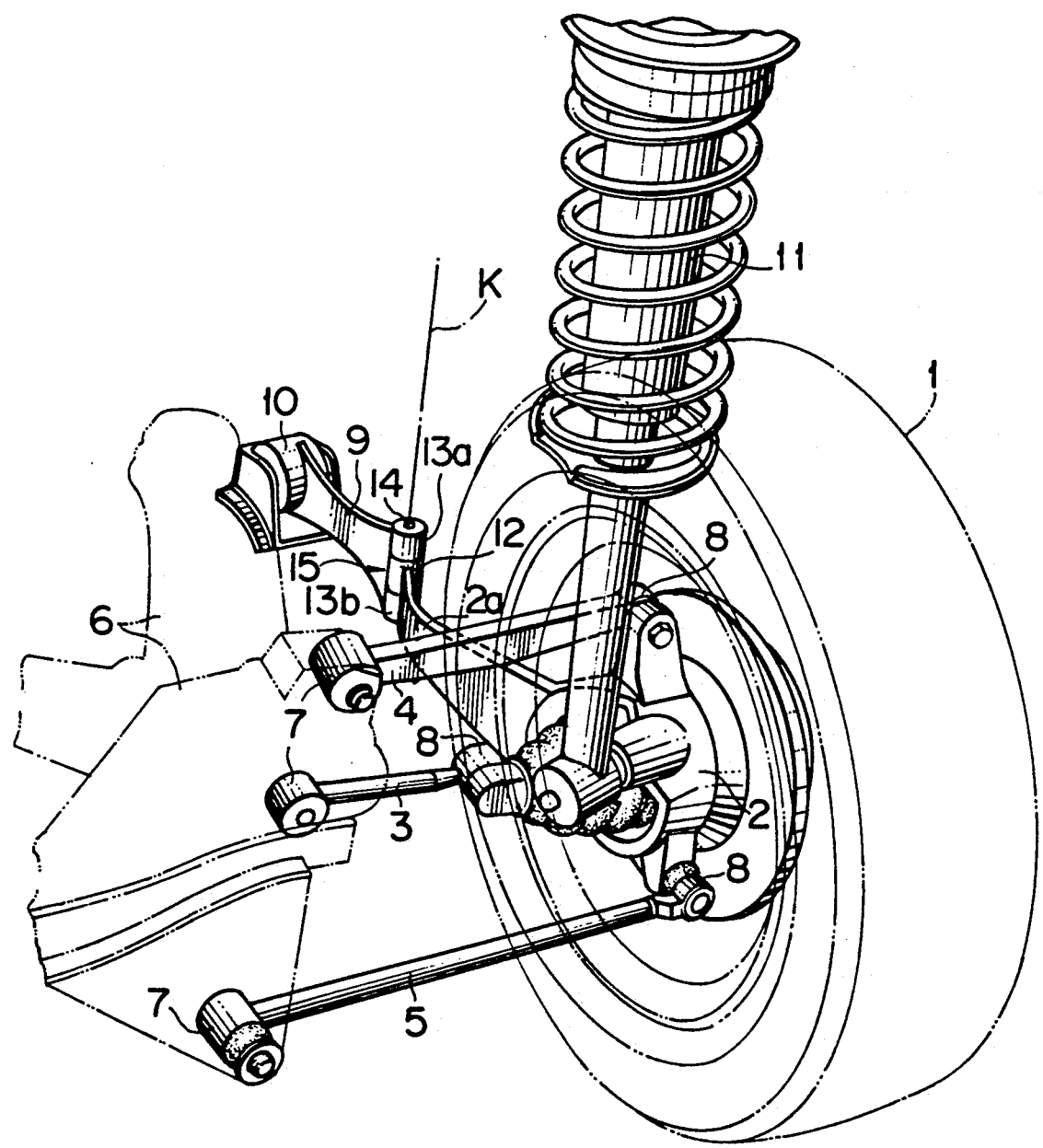
FIG. 1 is a perspective view of a suspension system in accordance with the present invention.
Figure 2:
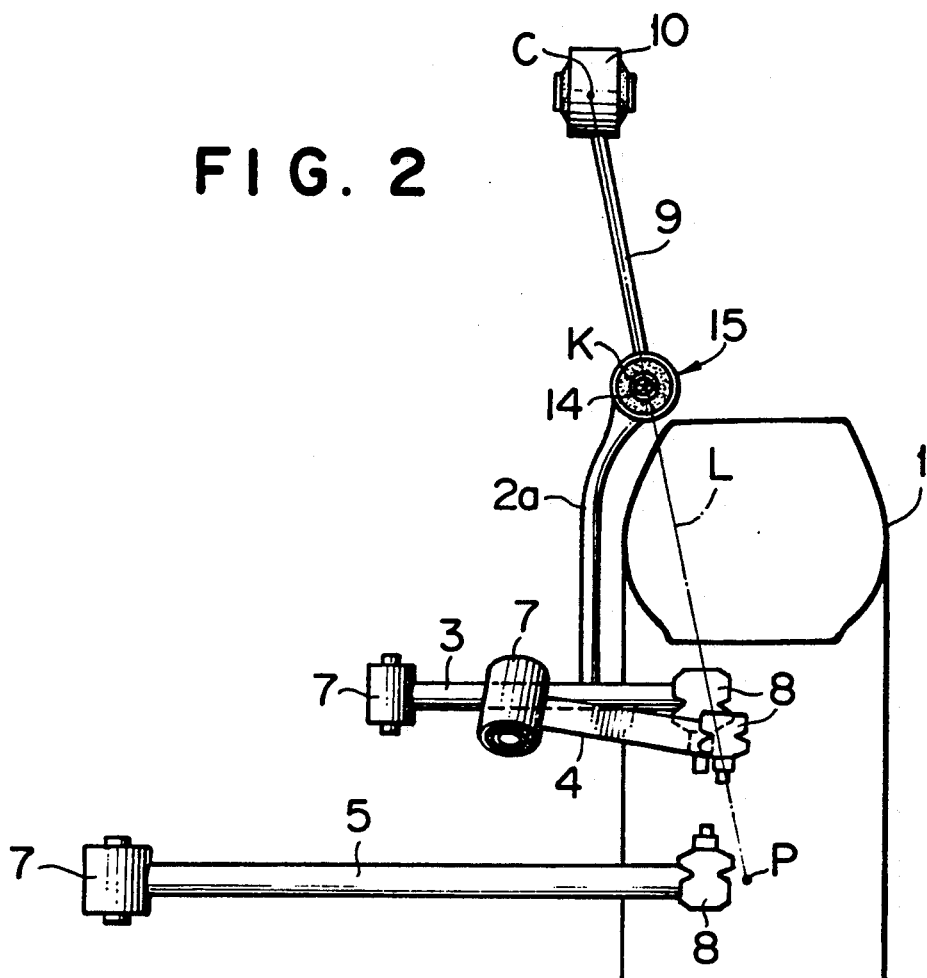
FIG. 2 is a plan view of the suspension system of FIG. 1.

Referring to the drawings, specifically to FIGS. 1 and 2, there is shown a vehicle rear suspension system in accordance with the present invention.

The suspension system comprises a wheel carrying member 2 for rotatably carrying a rear wheel 1 with a tire, a first lateral link 3, a second lateral link 4 and a third lateral link 5 of a rod configuration extending in a transverse direction of the vehicle. Each of the lateral links 3, 4 and 5 is connected at its inner end with a subframe 6 of a vehicle body through a rubber bushing 7 for a swinging movement in an up and down direction and with the wheel carrying member 2 at its outer end through a ball joint 8.

The suspension system further comprises a trailing arm of 9 a substantially vertically extended plate member extending in a longitudinal direction of the vehicle. The trailing arm is connected with the subframe at a front end thereof through a rubber bushing 10 for a swinging movement in the up and down direction and with the wheel carrying member 2 at a rear end thereof. Thus, it will be understood that the wheel 1 or wheel carrying member 2 is mounted on the vehicle body through the three lateral links 3, 4 and 5 and the trailing arm 9.

The suspension is also provided with a shock absorber 11 for providing a damping effect against an up and down movement of the wheel 1. The wheel carrying member 2 is provided with an extension 2a of a vertically extended plate configuration extending forwardly and outwardly in the transverse direction. The extension 2a is provided at its front end with a cylindrical portion 2b in which a rubber bushing 12 is disposed. The trailing arm 9 is provided at its rear end with a pair of cylindrical portions 9a, 9b of a biforked configuration in which rubber bushings 13a, 13b are disposed, respectively. The cylindrical portion 2b of the extension 2a is intervened between the cylindrical portions 9a, 9b. The cylindrical portions 2b, 9a and 9b and the rubber bushings 12, 13a and 13b are arranged substantially coaxially. A pin 14 is extended therethrough so as to form a common shaft in an up and down direction. Thus, the cylindrical portions 2b, 9a and 9b, the rubber bushings 12, 13a and 13b and the pin 14 constitute a joint 15 connecting the trailing arm 9 and the wheel carrying member 2. It will be understood that the joint 15 allows a relative angular movement about a joint axis K or an axis of the pin 14 between the trailing arm 9 and the wheel carrying member 2 but resists against a relative displacement in the up and down direction or an axial direction of the pin 14. The joint axis K extends substantially in a vertical direction. Thus, the trailing arm 9 is rigidly connected with the extension 2a of the wheel carrying member 2 in the vertical direction.

As clearly shown in FIG. 2, the joint 15 is located on a line L crossing both a front connecting point of the trailing arm and the subframe 6 or a center C of the bushing 12 and a wheel center P.

In operation, when the vehicle is in a bumping condition or a rebounding condition so that the vehicle body moves upwardly and downwardly relative to the wheel 1, the trailing arm 9 is swung about the rubber bushing 10 in the up and down direction. Likewise, the lateral links 3, 4 and 5 are swung about the rubber bushings 7 at the inner ends in the up and down direction respectively. The lateral links 3, 4 and 5 are elaborately designed to be mounted on the suspension system in size, arrangement and the like to get a desirable suspension geometry, such as toe angle, and camber angle and change properties thereof. Since the joint 15 allows the relative angular movement between the trailing arm 9 and the wheel carrying member 2, the wheel 1 can produce a toe angle change in response to the bumping and rebounding action of the vehicle.

When a rotative moment acts on the wheel 1 about a rotative axis thereof under a braking condition of the vehicle and the like, the trailing arm 9 resists against the moment because the trailing arm 9 is rigidly connected with the wheel carrying member 2 with regard to the vertical direction.

Further, in such a braking condition, a rearward force acts on the wheel center P. Essentially, this force acts on the lateral links 3, 4 and 5 and the trailing arm 9.

In this situation, if the joint 15 is located inward of the line L in the transverse direction, it will be understood that the wheel carrying member 2 or the wheel 1 produces a swinging movement in a horizontal plane in a toe-out direction.

To the contrary, the joint 15 illustrated in this embodiment is located on the line L so that no swinging movement of the wheel 1 is produced due to the rearward force under the braking condition. Thus, a toe-out trend of the wheel can be prevented when a brake is in operation to improve running stability of the vehicle.

Figure 3:
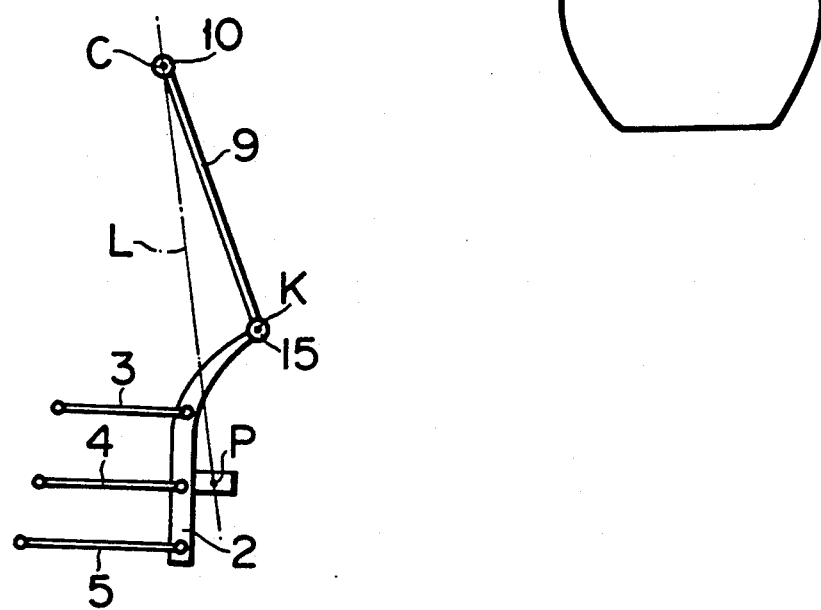
FIG. 3 is a plan view of a suspension system similar to FIG. 2 but showing another embodiment of the present invention.

Referring to FIG. 3, there is shown another embodiment of the present invention. In this embodiment, the joint 15 is located outward of the line L in the transverse direction.

With this structure, when the rearward force acts on the wheel center P to urge the lateral links 3, 4 and 5 and the trailing arm 9 in the case where the brake is operated, the wheel 1 produces a slight toe-in movement so that the running stability can be improved.

Figure 4A:
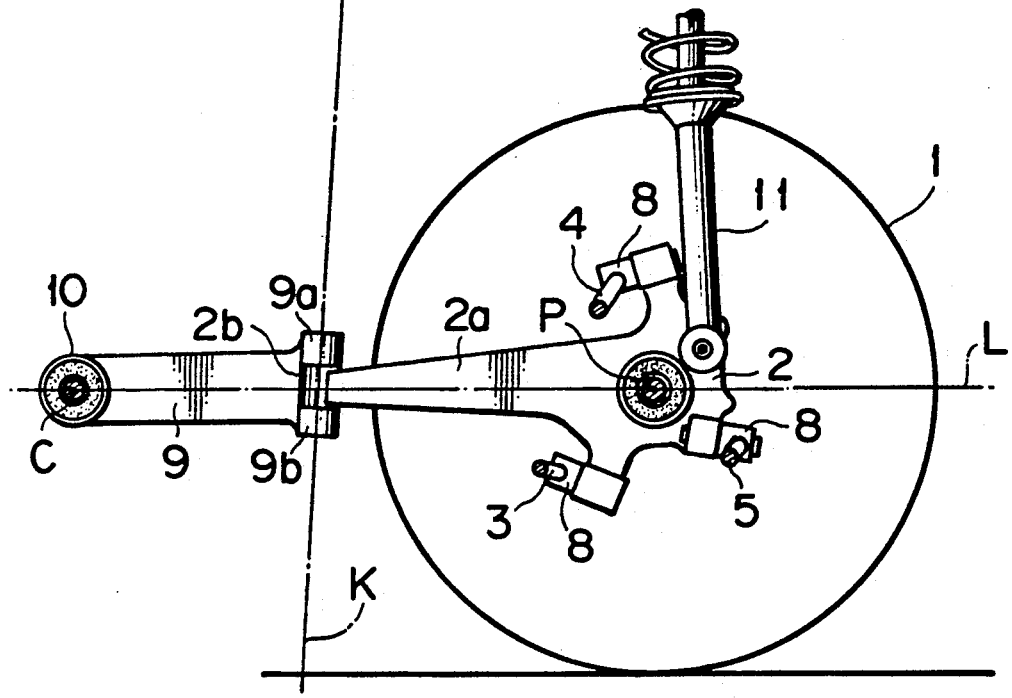
FIG. 4A is an inside view of a suspension system of still another embodiment of the present invention.
Figure 4B:
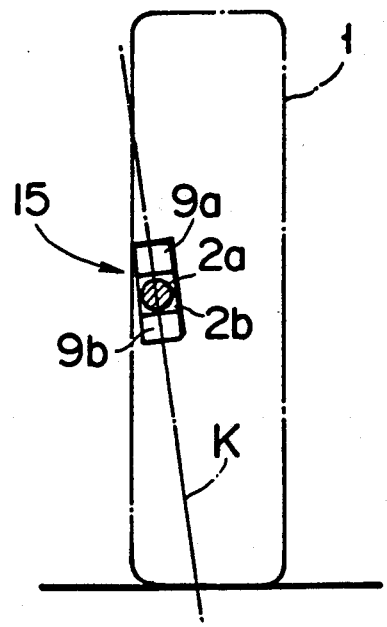
FIG. 4B is a rear side view of the suspension system of FIG. 4A.

According to FIGS. 4A and 4B, there is shown still another embodiment of the invention. In this embodiment, the joint 15 is constituted by elements similar to those of the former embodiment. The joint axis K extends in the up and down direction but oblique to the vertical direction downwardly forwardly and downwardly outwardly.

Figure 5:
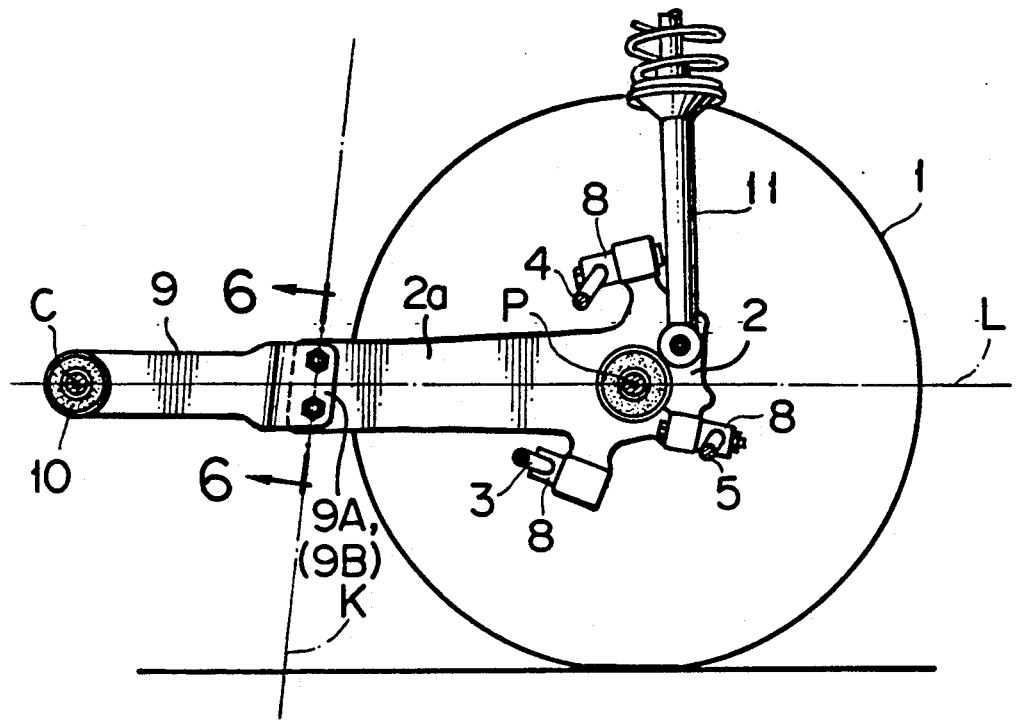
FIG. 5 is an inside view of a suspension system of a further embodiment of the present invention.
Figure 6:
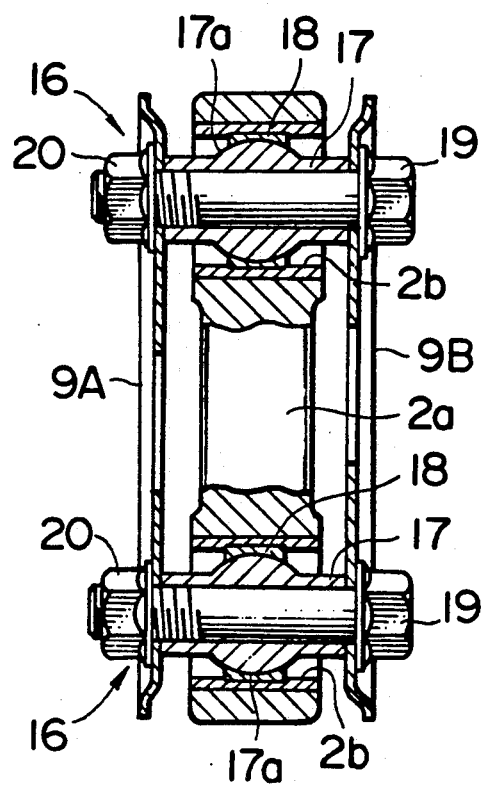
FIG. 6 is a sectional view of a joint of the suspension system as seen along a line A—A in FIG. 5.

Referring to FIGS. 5 and 6, a further embodiment of the present invention is illustrated.

In this embodiment, the trailing arm 9 is constituted by a pair of vertically extended plate members 9A, 9B extending longitudinally and parallel to each other. The joint 15 is provided with a pair of ball joint devices 16 spaced from each other in the up and down direction. The ball joint device 16 is provided with a cylindrical joint member 17 formed with a ball surface portion 17a. The joint member 17 is disposed in a hole 2b formed on the extension 2a of the wheel carrying member 2 and extending transversely so that the joint member 17 is carried by the wheel carrying member 2 through a ball seat member 18 disposed in the hole 2b. A bolt member 19 is inserted into the joint member 17 to be fixed to the trailing arm 9 by means of a nut 20. As a result, the joint member 17 is fixed to the trailing arm 9. With this structure, the joint 15 allows a certain relative swingable movement between the trailing arm 9 and the wheel carrying member 2 because of a function of the ball joint devices 16. The joint axis K of this structure is inclined forwardly as shown in FIG. 5.

Figure 7:
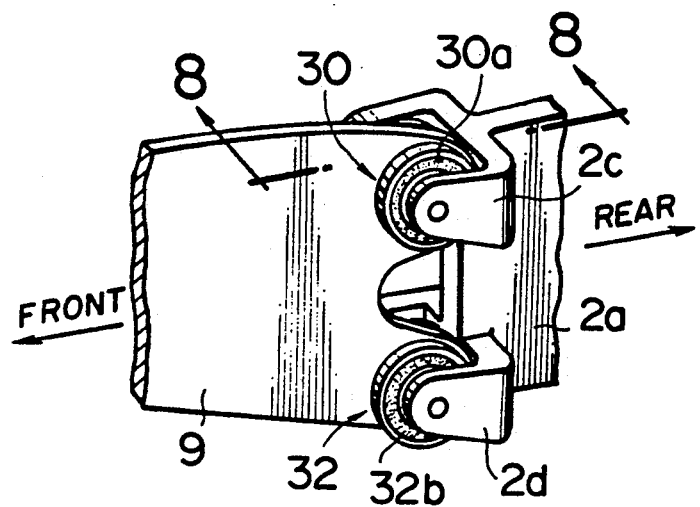
FIG. 7 is a perspective view of a joint in accordance with yet another embodiment of the present invention.
Figure 8:
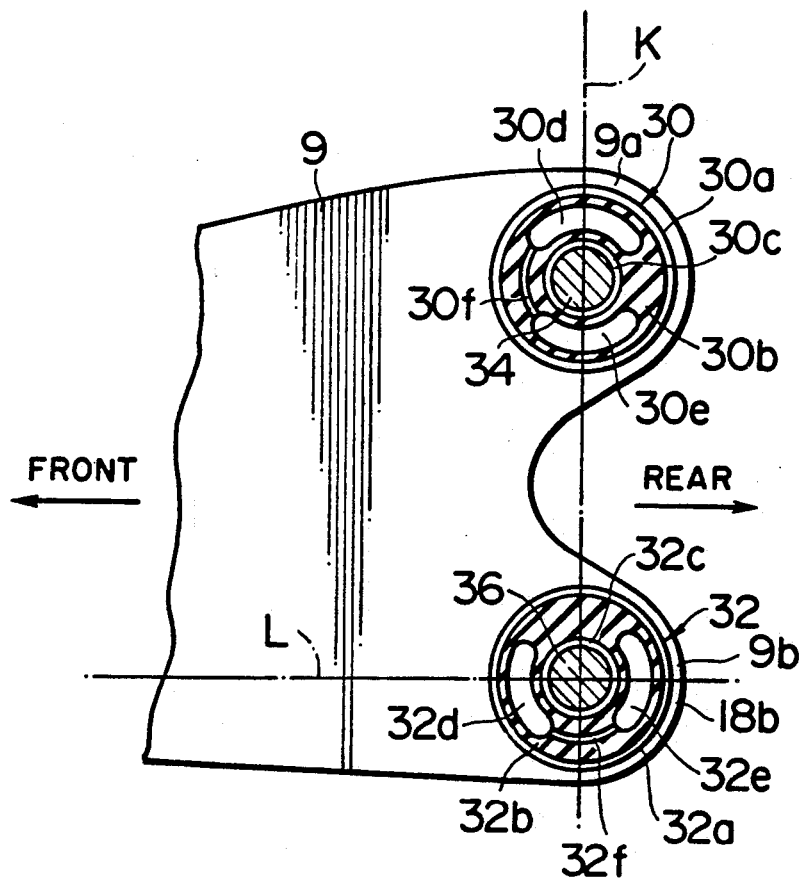
FIG. 8 is a sectional view as seen along a line B—B in FIG. 7.

Hereinafter, there is described a still further embodiment of the present invention. Reference should be made to FIGS. 7 and 8.

In the illustrated suspension system, the trailing arm 9 is provided with biforked portions 9a, 9b at its rear end. The biforked rear end portions 9a, 9b of the trailing arm 9 are provided with an upper and lower rubber bushings 30, 32 in which liquid or oil is sealed. They are projected transversely and symmetrically with regard to the trailing arm 9.

The upper rubber bushing 30, mounted on the upper rear end portion 9a, is provided with an outer tube 30a, a hollow rubber member 30b disposed inside of the outer tube 30a and an inner tube 30c disposed inside of the rubber member 30b. A upper horizontal shaft 34, extending transversely, is disposed in the inner tube 30c. The upper horizontal shaft 34 is rotatably supported at opposite ends thereof by an upper biforked portion 2c formed at a front and upper end of the extension 2a of the wheel carrying member 2.

The lower rubber bushing 32, mounted on the lower rear end portion 9b is likewise provided with an outer tube 32b, a hollow rubber member 32b disposed inside of the outer tube 32b and an inner tube 32c disposed inside of the rubber member 32b. A lower horizontal shaft 36, extending transversely, is disposed in the inner tube 32c. The lower horizontal shaft 36 is rotatably supported at opposite ends thereof by a lower biforked portion 2d formed at a front and upper end of the extension 2a of the wheel carrying member 2.

A swinging axis K of the trailing arm 9 and the wheel carrying member 2 is defined by a line connecting a transverse axis of the horizontal shafts 34 and 36.

The lower rubber bushing 32 is positioned in the vicinity of the line L connecting the mounting point of the trailing arm 9 on the vehicle body and the wheel center P.

The upper rubber bushing 30 is formed with a pair of oil chambers 30d, 30e of elongated configuration section in the longitudinal direction of the vehicle located at an upper portion and a lower portion of the rubber member 30b and extending transversely, respectively. The oil chambers 30d, 30e are arranged symmetrically with regard to the transverse axis of the horizontal shaft 34 to face each other with the horizontal shaft 34 between and connected with each other by an orifice 30f. The oil chambers 30d, 30e are filled with an oil. Thus, as one of the chambers 30d, 30e is deformed to be expanded in volume, the other of the chambers 30d, 30e is deformed to be reduced in volume.

Likewise, the lower rubber bushing 32 is formed with a pair of oil chambers 32d, 32e of elongated configuration in section in the up and down direction located at a front portion and a rear portion of the rubber member 32b and extending transversely, respectively. The oil chambers 32d, 32e are arranged symmetrically with regard to the transverse axis of the horizontal shaft 36 to face each other with the horizontal shaft 36 between and connected with each other by an orifice 32f. The oil chambers 32d, 32e are also filled with an oil. As one of the chambers 32d, 32e is deformed to be expanded in volume, the other of the chambers 32d, 32e is deformed to be reduced in volume.

The upper rubber bushing 30 resists against a deformation in the up and down direction, due to the oil chambers 30d, 30e, to provide the suspension system with a damping effect. Similarly, the lower rubber bushing 32 provides the suspension system with a damping effect in the longitudinal direction due to the oil chambers 32d, 32e. This is because the orifices 30f and 32f restrict a transfer of the oil between the chambers 30d, 30e and 32d, 32e, respectively at the time of deformation of the bushings 30, 32.

It will be apparent from the above description that many modifications and variations may be made by those skilled in the art without departing from the scope of the claimed invention as defined by the appended claims.

We claim:

1. A vehicle rear suspension system comprising:
   wheel carrying means for rotatably carrying a wheel of a vehicle,
   a plurality of lateral member means, each of said lateral member means extending in a transverse direction of the vehicle and connected to a vehicle body at its inner end and to the wheel carrying means at its outer end, and
   longitudinal member means extending in a longitudinal direction and connected to the vehicle body at its front end for pivotal movement and to the wheel carrying means at its rear end through joint means, the joint means being located in one of first and second positions, said first position being located on a substantially straight line extending through both a front connecting point between the longitudinal member means and the vehicle body and a wheel center, said second position being located outward of the substantially straight line in the transverse direction, said joint means allowing a relative angular displacement between the wheel carrying means and the longitudinal member means in a substantially horizontal plane.

2. A vehicle rear suspension system as recited in claim 1 wherein the joint means is constituted by pivot means having an axis extending substantially in an up and down direction for allowing a relative angular displacement between the wheel carrying means and the longitudinal member means about the axis.

3. A vehicle rear suspension system as recited in claim 2 wherein the axis of the pivot means extends obliquely, outwardly and downwardly relative to a vertical direction.

4. A vehicle rear suspension system as recited in claim 2 wherein the axis of the pivot means extends obliquely, forwardly and downwardly relative to a vertical direction.

5. A vehicle rear suspension system as recited in claim 2 wherein the joint means comprises a pair of ball joints spaced from each other in the up and down direction to provide said axis.

6. A vehicle rear suspension system as recited in claim 1 wherein the joint means is provided with liquid sealed bushing means having an axis about which the relative angular displacement is produced between the longitudinal member means and the wheel carrying means.

7. A vehicle rear suspension system as recited in claim 6 wherein the bushing means are arranged to provide a damping effect against the relative angular displacement in the substantially horizontal plane between the longitudinal member means and the wheel carrying means.

8. A vehicle rear suspension system as recited in claim 6 wherein the bushing means are arranged to provide a damping effect against the relative displacement in the longitudinal direction therebetween.

9. A vehicle rear suspension system as recited in claim 6 wherein each of the bushing means is provided with shaft means extending in the transverse direction, rubber member surrounding the shaft means, a pair of liquid chambers formed in the rubber member facing each other with the shaft means therebetween for providing the damping effect.

10. A vehicle rear suspension system as recited in claim 9 wherein the joint means is provided with a pair of the bushing means arranged in a spaced relationship in an up and down direction to provide said axis, an upper one of the bushing means being provided with a pair of liquid chamber means of elongated configuration section in the longitudinal direction of the vehicle located at an upper portion and a lower portion facing each other with the shaft means therebetween and extending transversely, respectively, the lower one of the bushing means being provided with a pair of liquid chamber means of elongated configuration in section in the up and down direction located at a front portion and a rear portion facing each other with the shaft means therebetween and extending transversely, respectively.

11. A vehicle rear suspension system as recited in claim 10 wherein the liquid chamber means of each of the bushing means are connected by orifice means with each other.

12. A vehicle rear suspension system as recited in claim 1 wherein the wheel carrying means is provided with an extension extending forwardly to be connected with the longitudinal member means through the joint means.

13. A vehicle rear suspension system as recited in claim 12 wherein the extension extends forwardly beyond a front end of a tire of the wheel.

14. A vehicle rear suspension system as recited in claim 13 wherein the extension is of an arcuate configuration curved transversely outwardly.

15. A vehicle rear suspension system as recited in claim 1 wherein the lateral member means is constituted by three lateral links carried independently from one another.

16. A vehicle rear suspension system as recited in claim 15 wherein the wheel carrying means is connected with the vehicle body through an upper lateral link at an upper portion.

17. A vehicle rear suspension system as recited in claim 16 wherein a pair of lateral links spaced in the longitudinal direction connect a lower portion of the wheel carrying means with the vehicle body.

* * * * *